United States Patent [19]

Fukuda et al.

[11] Patent Number: 5,175,844
[45] Date of Patent: Dec. 29, 1992

[54] EXECUTION RATE CONTROLLING DEVICE

[75] Inventors: Yasushi Fukuda; Hitoshi Shimizu, both of Tokyo, Japan

[73] Assignee: NEC Corporation, Tokyo, Japan

[21] Appl. No.: 595,816

[22] Filed: Oct. 11, 1990

[30] Foreign Application Priority Data

Oct. 11, 1989 [JP] Japan .................................. 1-265429

[51] Int. Cl.⁵ .............................................. G06F 1/14
[52] U.S. Cl. .................................................... 395/550
[58] Field of Search ......................... 364/200; 395/550

[56] References Cited

U.S. PATENT DOCUMENTS

| | | | |
|---|---|---|---|
| 4,611,273 | 9/1986 | Pione | 395/775 |
| 4,613,806 | 9/1986 | Majewski | 318/696 |
| 4,807,112 | 2/1989 | Hamasaki | 395/550 |
| 4,819,164 | 4/1989 | Branson | 395/550 |
| 4,975,913 | 12/1990 | Watanabe | 370/112 |

Primary Examiner—Eugene R. LaRoche
Assistant Examiner—Michael C. Kessell
Attorney, Agent, or Firm—Foley & Lardner

[57] ABSTRACT

In order to control an execution rate of a central processing unit which carries out a processing operation in synchronism with a clock signal supplied from a clock oscillator, an execution rate controlling device periodically supplies a hold demand signal to suspend the processing operation during reception of the hold demand signal and comprises a data holding unit for holding held data representative of the execution rate. A generating unit generates the hold demand signal in response to the held data and the clock signal so that the hold demand signal may last for a duration which is inversely proportional to the execution rate. The generating unit comprises a counter unit for counting a count in synchronism with the clock signal up to a maximum value defining a period of periodic supply of the hold demand signal, and produces counted data indicative of the count and a carry signal initializing the count to zero when the count reaches the maximum value. A comparing unit compares the held data with the counted data and produces a coincidence signal when the held data and the counted data coincide with each other. A supplying unit supplies the hold demand signal to the central processing unit from a time instant of reception of the coincidence signal to a time instant of reception of a carry signal.

2 Claims, 1 Drawing Sheet

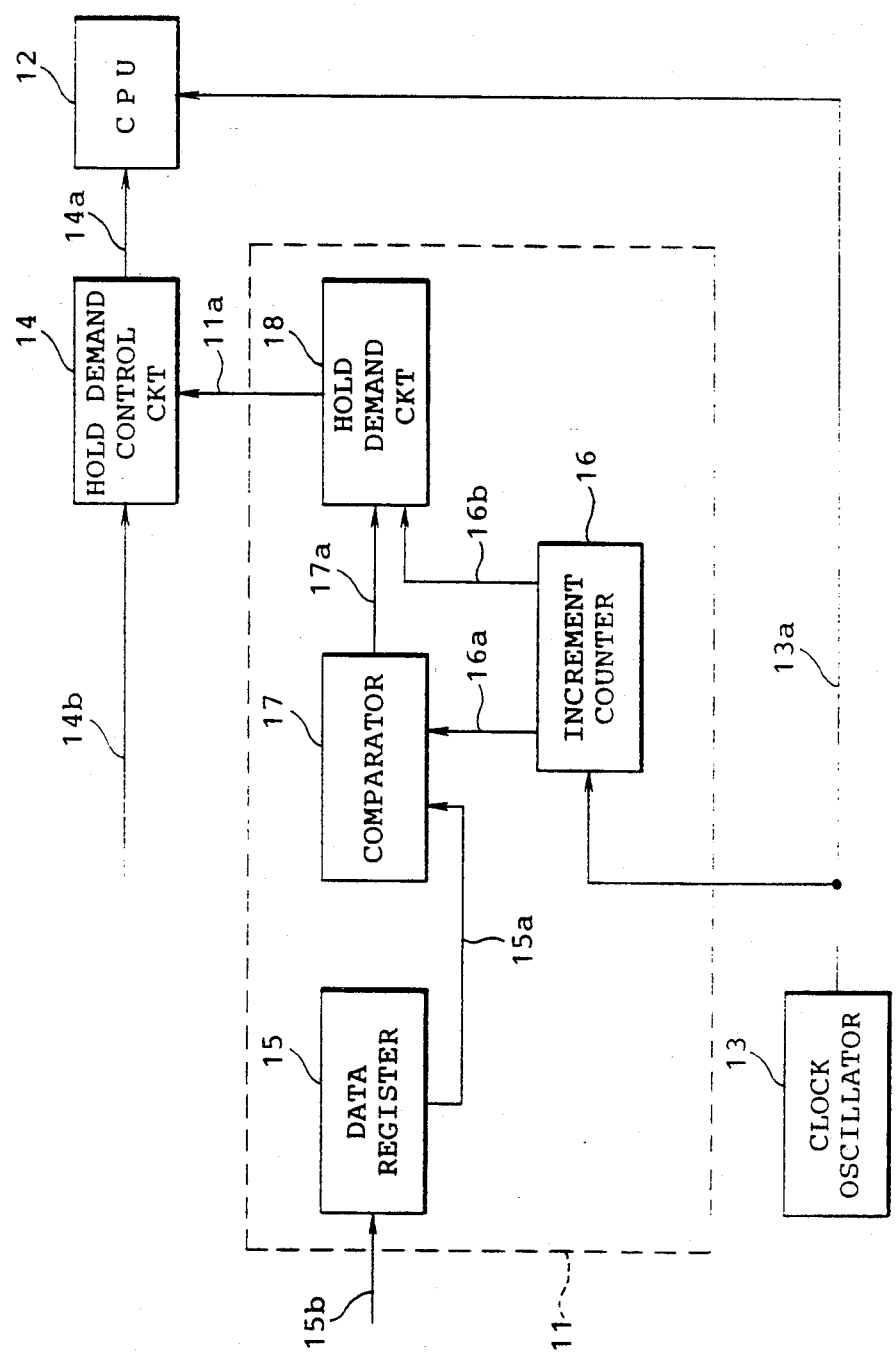

EXECUTION RATE CONTROLLING DEVICE

BACKGROUND OF THE INVENTION

This invention relates to an execution rate controlling device for controlling an execution rate of central processing unit.

The central processing unit carries out a processing operation in synchronism with a first clock signal supplied from a first clock oscillator. The central processor unit has an operation rate decided by the first clock oscillator. The first clock oscillator is therefore used for the central processing unit.

The execution rate controlling device suspends operation of the central processing unit periodically. The execution rate is decided by the operation rate and a suspended duration of the operation. In this manner, the execution rate controlling device controls an execution rate of the central processing unit.

According to prior art, the execution rate controlling device comprises a data register, a decrement counter, and a second clock oscillator for the decrement counter. The data register holds a hold time data representative of the suspended duration that is in inverse proportion to the execution rate of the central processing unit. The second clock oscillator produces a second clock signal. The decrement counter is connected to the data register, the second clock oscillator, and the central processing unit. The decrement counter preloads a hold time data when it receives a periodical refresh signal for a DRAM of a main memory. The decrement counter counts down a count from the hold time data to zero in synchronism with the second clock signal. The decrement counter produces a hold demand signal from a time instant of count zero to another time instant of reception of the refresh signal. The central processing unit suspends operation during reception of the hold demand signal.

A reduction rate is a ratio of the execution rate to the operation rate. If the operation rate varies with the first clock oscillator, then the reduction rate varies. This is because the execution rate controlling device depends on the refresh signal and the second clock signals and is independent of the first clock oscillator. It is therefore necessary to set a new hold time data in the data register when the first clock oscillator generates the first clock signal with a different clock period.

In this manner, the execution rate controlling device controls the execution rate of the central processing unit.

SUMMARY OF THE INVENTION

It is therefore an object of the present invention to provide an execution rate controlling device which can set a reduction rate of an execution rate of a central processing unit independent of a clock oscillator for the central processing unit.

On describing the gist of this invention, it is possible to understand that an execution rate controlling device is for controlling an execution rate of the central processing unit which carries out a processing operation in synchronism with a clock signal supplied from a clock oscillator. The execution rate controlling device periodically supplies a hold demand signal to the central processing unit to suspend the processing operation during reception of the hold demand signal.

According to this invention, the above-understood execution rate controlling device comprises: holding means for holding, as held data, data representative of the execution rate; and generating means connected to the holding means, the clock oscillator, and the central processing unit for periodically generating the hold demand signal in response to the held data and the clock signal, the hold demand signal being produced for a duration which is in inverse proportion to the execution rate represented by the held data.

BRIEF DESCRIPTION OF THE DRAWING

The sole FIGURE is a block diagram of an execution rate controlling device according to an embodiment of the present invention.

DESCRIPTION OF THE PREFERRED EMBODIMENT

Referring to the FIGURE, the description will be directed to an execution rate controlling device 11 according to a preferred embodiment of this invention. The execution rate controlling device 11 controls an execution rate of a central processing unit (CPU) 12. The central processing unit 12 carries out processing operation in synchronism with a clock signal 13a supplied from a clock oscillator 13. The execution rate controlling device 11 periodically supplies a hold demand control circuit 14 with a generated hold demand signal 11a which will become clear as the description proceeds. The hold demand control circuit 14 produces a CPU hold demand signal 14a for the central processing unit 12 when it receives either the generated hold demand signal 11a or a system hold demand signal 14b from peripheral devices (not shown). The CPU hold demand signal 14a suspends operation of the central processing unit 12. The generated hold demand signal 11a is herein referred to simply as a hold demand signal.

The execution rate controlling device 11 comprises a data register 15, an increment counter 16, a comparator 17, and a hold demand circuit 18.

The data register 15 holds a hold demand time data 15b representative of an execution rate of the central processing unit 12. The hold demand time data 15b is supplied from an input device (not shown).

The increment counter 16 is connected to the clock oscillator 13 and has a maximum value (MV). The maximum value defines a period of periodic supply of the generated hold demand signal 11a. The increment counter 16 counts up a count to the maximum value in synchronism with the clock signal 13a. The increment counter 16 produces a counted data 16a, indicative of the count, and a carry signal 16b, initializing the count to zero when the count reaches the maximum value.

The comparator 17 is connected to the data register 15 and the increment counter 16. The comparator 17 compares the hold demand time data 15a with the counted data 16a. The comparator 17 produces a coincidence signal 17a when the hold demand time data 15a and the counted data 16a coincide with each other.

The hold demand circuit 18 is connected to the comparator 17, the increment counter 16, and the hold demand control circuit 14. The hold demand circuit 18 supplies the generated hold demand signal 11a to the hold demand control circuit 14 from a time instant of reception of the coincidence signal 17a to a time instant of reception of the carry signal 16b.

Therefore, the execution rate controlling device 11 periodically generates the generated hold demand signal 11a in response to the hold demand time data 15a and the clock signal 13a. The generated hold demand signal 11a is produced for a duration which is in inverse proportion to the execution rate represented by the hold demand time data 15a. The demand time data 15a has a set value (SV) between 0 and the maximum value (MV). When the set value is 0, the execution rate is 0. When the set value is equal to the maximum value, the execution rate is a maximum. A reduction rate (Rr) can have a value between 0 and 1 and is expressed by $(Rr)=(MV-SV)/MV$. The reduction rate does not depend on the clock signal 13a. It is unnecessary to set a new hold time data when the clock oscillator 13 generates the clock signal 13a with a different clock period.

What is claimed is:

1. An execution rate controlling device for controlling an execution rate of a central processing unit which carries out a processing operation in synchronism with a clock signal, said execution rate controlling device periodically supplying a hold demand signal to said central processing unit to suspend said processing operation during reception of said hold demand signal, said execution rate controlling device comprising:

holding means for holding, as held data, data representative of said execution rate; and a generating device connected to said holding means, said clock oscillator, and said central processing unit, which periodically generates said hold demand signal in response to said held data and said clock signal, said hold demand signal being produced for a duration which is inversely proportional to said execution rate represented by said held data.

2. An execution rate controlling device as claimed in claim 1, wherein said generating device comprises:

comparing means, for comparing said held data with said counted data to produce a coincidence signal when said held data and said counted date coincide with each other; and supplying means, connected to said comparing means, said counter means, and said central processing unit, for supplying said hold demand signal to said central processing unit from a time instant of reception of said coincidence signal to a time instant of reception of said carry signal.

* * * * *